Aug. 4, 1953 G. J. OSTERFELD 2,647,448
GRAVEL SPREADER
Filed April 19, 1949 4 Sheets-Sheet 1

INVENTOR.
GEORGE J. OSTERFELD.
BY
Charles Marshall Hogan,
ATTY

Aug. 4, 1953 G. J. OSTERFELD 2,647,448
GRAVEL SPREADER
Filed April 19, 1949 4 Sheets-Sheet 2

INVENTOR.
GEORGE J. OSTERFELD.
BY
Charles Marshall Hogan
ATTY.

Aug. 4, 1953  G. J. OSTERFELD  2,647,448
GRAVEL SPREADER
Filed April 19, 1949  4 Sheets-Sheet 3

INVENTOR.
GEORGE J. OSTERFELD.
BY
Charles Marshall Hogan
ATTY.

Aug. 4, 1953

G. J. OSTERFELD 2,647,448

GRAVEL SPREADER

Filed April 19, 1949

INVENTOR.
GEORGE J. OSTERFELD.
BY
Charles Marshall Hogan,
ATTY.

Patented Aug. 4, 1953

2,647,448

UNITED STATES PATENT OFFICE 2,647,448

GRAVEL SPREADER

George J. Osterfeld, Cincinnati, Ohio, assignor of one-half to Timothy S. Hogan, Loveland, Ohio Application April 19, 1949, Serial No. 88,434

1 Claim. (Cl. 94—44)

The present invention relates to machines for depositing paving material on roads and specifically to a novel self-propelled vehicular machine for spreading and compacting gravel.

Prior art gravel spreaders generally are of the type comprising a hopper-like body, formed to define a storage compartment which receives gravel, and a feed mechanism for depositing the stored gravel on the road. This prior art spreader is supplied with gravel from a separate vehicle or truck, which continuously unloads the gravel into the storage compartment as it backs down the roadway on which gravel is to be spread, pushing the spreader while wheels frictionally rotated by the road surface actuate the feed mechanism. Such a prior art machine suffers from one or more of the following disadvantages:

First, since it drives its prime motion from a truck, the truck is rendered unavailable for hauling service during the period of spreading operations;

Second, when the truck is detached for hauling service, then the spreader is immobile and unavailable for service until another truck is hitched to the spreader;

Third, the operation of backing a truck down a road is cumbersome and inherently dangerous to the lives and safety of the crew and others present on the road;

Fourth, the articulation of truck and spreader, prior to spreader operation, is a time-consuming task;

Fifth, the attention of the truck driver is fully consumed in driving the vehicle and that factor and his position on the truck are such that other crew members are required for maintaining a lookout over the road area on which gravel is to be spread;

Sixth, the maintenance of a steady continuous flow of gravel from the dump body of a backing truck into the small prior-art spreader compartment has been found in practice to require the services of at least one and generally two additional crew members, to prevent excessive spilling and irregular supplying of gravel to the spreader.

In summary, prior art spreaders heretofore in commercial use not only constitute safety hazards but they also represent "make work" economies in requiring a number of personnel—generally four—out of all proportion to the technological magnitude of the function to be performed, i. e., spreading and compacting of gravel. Such prior art spreaders also tie up haulage equipment for excessively long periods. Further, spreaders heretofore in commercial use do not compact and roll the distributed gravel, and the performance of that phase of construction work requires other capital and payroll and maintenance expenses, in the form of rolling machines and personnel.

The basic object of the present invention is to overcome those disadvantages and limitations of prior art spreaders. Specifically, the broad objects of the invention are:

(1) To provide a high-capacity self-propelled gravel spreader;

(2) To provide a gravel spreader which may be operated and controlled by only one crew member;

(3) To provide a gravel spreader which reduces traffic hazards in that it travels along the ordinary line of sight of the driver;

(4) To provide a gravel spreader which accepts a complete load of material from a dump truck and does not require continuous inward feed of gravel from a source of supply;

(5) To provide a gravel spreader which does not suffer from excessive spillage or irregular feed;

(6) To provide a gravel spreader which does not interrupt the service availability of its supply trucks for periods greater in duration than the quick dumping operations require;

(7) To provide a gravel spreader which does not require articulation with a driving vehicle;

(8) To provide a combination gravel spreader and roller;

(9) To provide such a combination which is so arranged that the weight of the stored gravel augments the compression of the roller;

(10) To provide a spreader which positively feeds the gravel and does not depend on irregular gravitational flow from a supply truck;

(11) To provide a spreader which is adjustable to distribute gravel over a wide strip of road or a narrow strip of road;

(12) To provide a commercially practicable spreader, the capital amortization cost of which is very small by comparison with the resultant savings in payroll, truck-service-availability, and other advantages.

For a better understanding of the present invention, together with other and further objects, advantages and capabilities thereof, reference is made to the following detailed description of the accompanying drawings in which there is disclosed an illustrative preferred form of gravel spreader in accordance with the invention.

The invention provides a self-propelled gravel spreader comprising a chassis, a body mounted on said chassis and formed with a compartment opening upwardly toward the rear for the reception and storage of gravel to be distributed, and means for continuously depositing a layer of gravel. This means comprises a conveyor supported by said chassis and having a belt, the upper run of which extends upwardly and forwardly to define a substantial portion of the bottom of said compartment. A prime-mover and power-transfer means are supported by the chassis for propelling the spreader. The prime-mover is also mechanically coupled to the conveyor to drive it continuously in such a manner that gravel is fed from the rear to the front of the compartment. Means is provided adjacent the front of the compartment for spreading the gravel. The rear supports for the chassis are provided by rollers which compact the distributed gravel.

These features are illustrated in the accompanying drawings in which.

Figure 1:
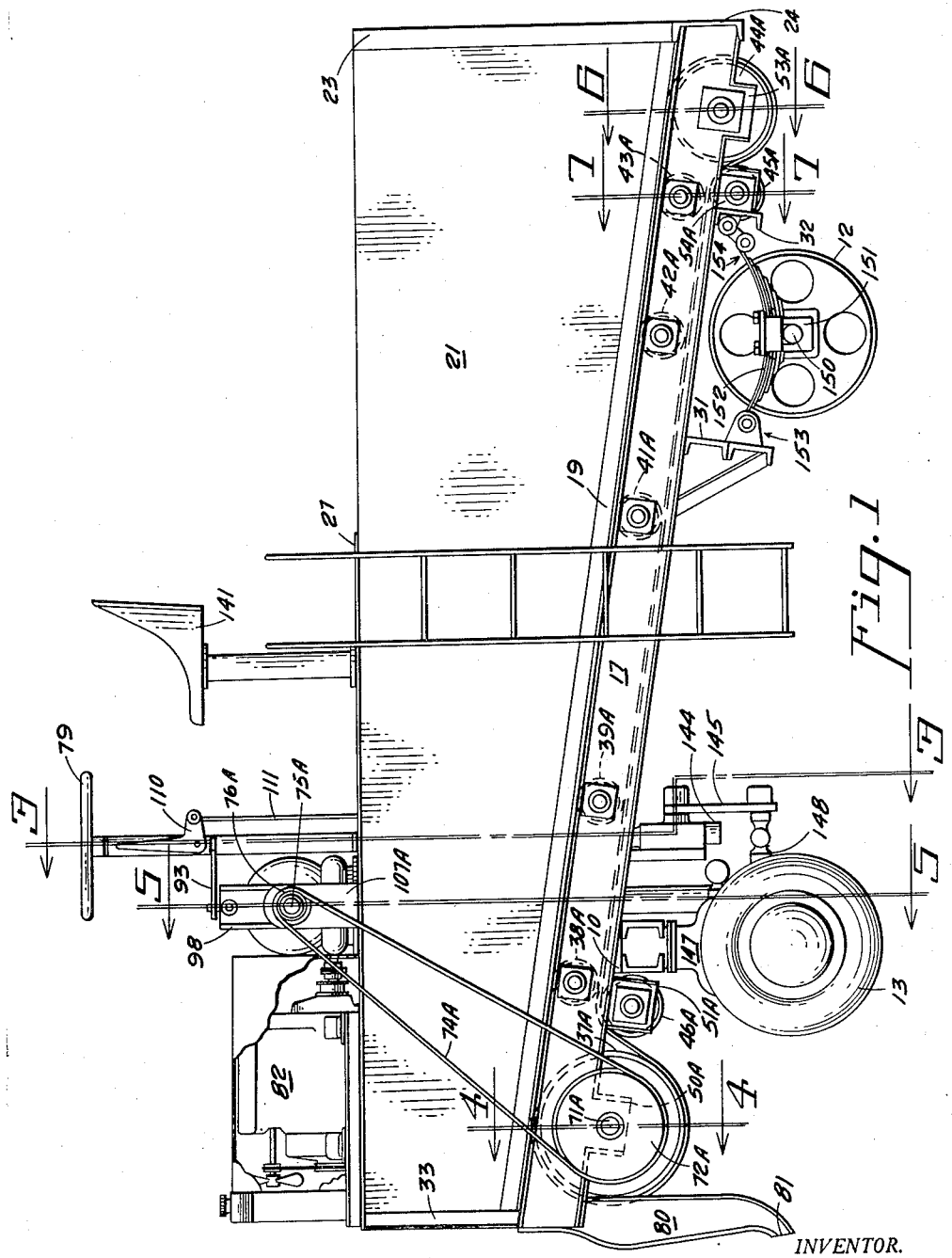
Fig. 1 is a side elevational view of a complete self-propelled gravel spreader in accordance with the invention.

Figs. 3, 4, 5, 6 and 7 are elevational sectional views, taken on lines 3—3, 4—4, 5—5, 6—6 and 7—7 of Fig. 1, looking in the direction of the arrows;

Figs. 3, 4, 6 and 7 are partly broken away in order to clarify enlarged details.

The gravel spreader shown in the accompanying drawings comprises the following principal components:

The body, which has a storage compartment for the gravel to be distributed;
The chassis;
The conveyor system for feeding gravel diagonally upwardly and forwardly from the rear of the storage compartment to the discharge opening at the front;
The prime-mover or motor;
The mechanical coupling system and controls for transferring power from the motor to the driving wheels;
The steering mechanism;
The mechanical coupling system and controls for transferring power from the motor to the conveyor system;
The roller system for compressing the distributed gravel.

*The body and chassis*

Figure 2:
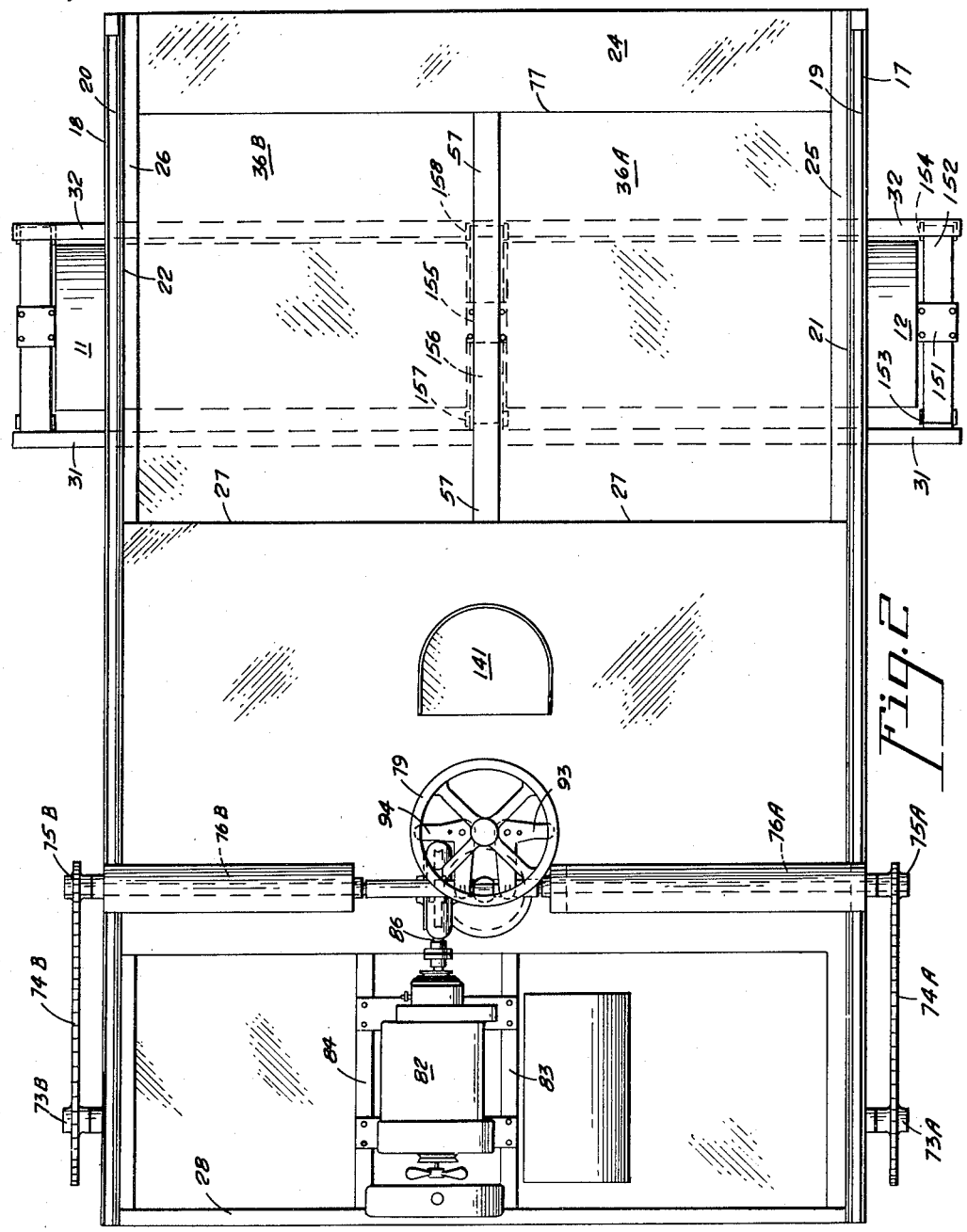
Fig. 2 is a top plan view thereof.

The particular body and chassis construction herein shown is illustrative and the invention is not limited to this construction. The spreader is mounted for self-propulsion on a pair of rear gravel compacting rollers 11 and 12 and twin pairs of front wheels 13, 14 and 15, 16 (Figs. 1, 2 and 5).

The front-wheel assemblies are mounted on a cross-beam 10 (Figs. 3 and 5) which is permanently secured to lower side-frame members or sections 17, 18. Each of the sections 17, 18 provides support for and is secured to an L-shaped panel bracket 19, 20, respectively, extending substantially along the entire length of the associated section.

The assemblies for rollers 11, 12 are spring-shackled on spaced cross-beams 31, 32 (Figs. 1 and 2) secured to, disposed beneath, normal to, and extending outwardly beyond the main side frame members 17 and 18.

Figure 3:
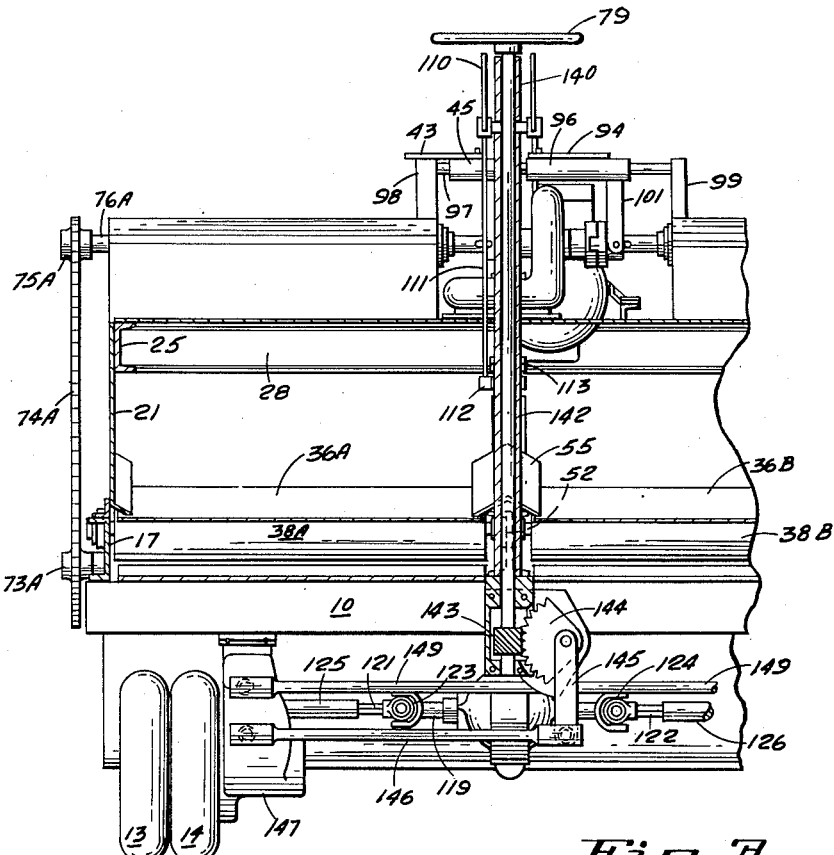
Figure 5:
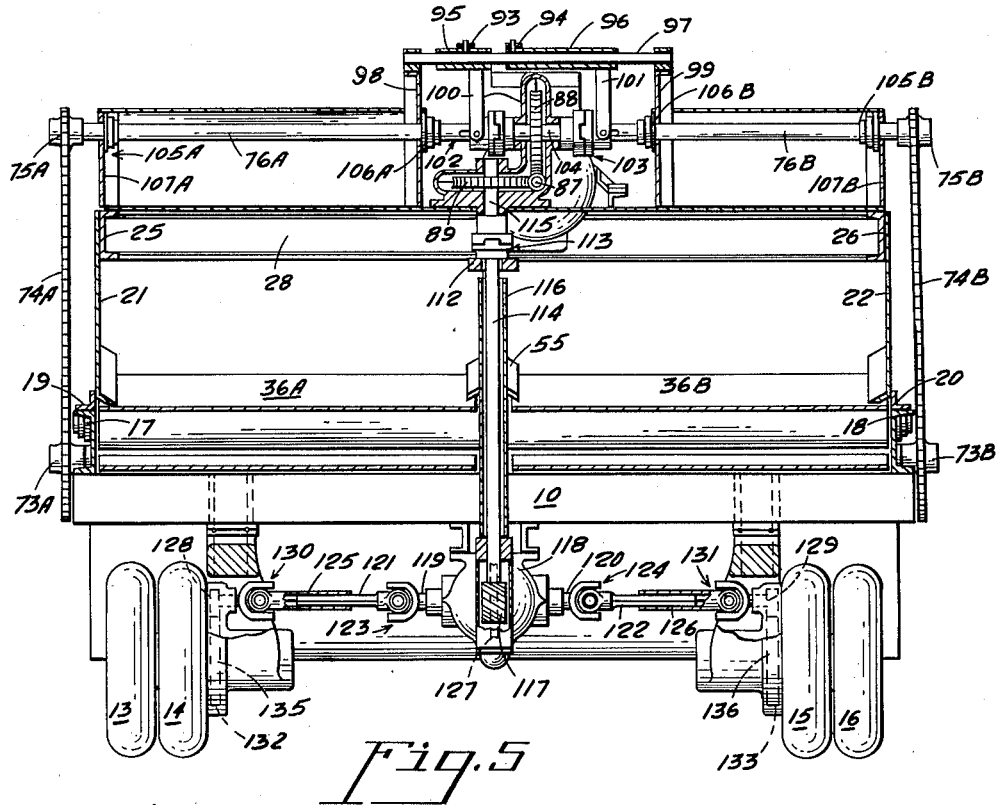

The sides of the body comprises side panels 21, 22, secured to the inner faces of brackets 19, 20, respectively (Fig. 5). The lower margins of the side panels are inclined inwardly and terminate adjacent to and inwardly from the outer margins of the conveyor belts, hereinafter described. The side panels 21, 22 are also secured to upper side-frame members or sections 25, 26 respectively. A front cross-beam 28 (Fig. 2) is secured to the front end of upper side sections 25, 26 (Figs. 2, 3 and 5).

The rear of the body comprises rear panel 23 (Fig. 1), the side margins of which are bent forwardly slightly to overlap side panels 21, 22, to which they are secured. The lower edge of rear panel 23 is secured to the lower rear cross beam 24, the ends of which are secured to lower side sections 17 and 18.

The top of the body is formed by a top panel 27 (Figs. 1 and 2) extending forwardly, from a point to the front of the rollers, for about half of the total length of the spreader. Mounted on or adjacent to this top panel are the operator's seat, the motor, the steering wheel and other manual controls presently to be described. L-shaped members such as 33 (Fig. 1) extend vertically between upper and lower side section pairs 25, 17 and 26, 18 respectively.

It will be seen that lower cross-beams 10, 31, 32 and 24, upper cross beam 28, upper side members 25, 26, lower side members 17, 18, the vertical flanges such as 33 and the diagonally disposed flanges 19 and 20 provide a main chassis framework. The members are secured in assembly by any of the expedients well known to the art, preferably by welding. The side panels 21 and 22, rear panel 23 and top panel 27 define a compartment which is open throughout the rear of its top portion to receive a load of gravel to be distributed. The bottom of this chamber is substantially completely defined by the upper runs of a pair of conveyor belts presently to be described. These upper runs extend upwardly and forwardly, so that the gravel-storage compartment becomes progressively more shallow as its front is approached. The lower edges of the side panels accordingly extend diagonally upwardly, the side panels also becoming progressively more shallow toward the front. This construction places the center of gravity of the stored gravel near the vertical plane through the axis of rotation of rollers 11, 12, so that the weight of the stored gravel aids the pressure-compacting function performed by the rollers on the distributed gravel.

This compartment is filled with gravel in any usual manner. For example, a dump truck can back up until its rear is in proximity to rear panel 23, discharge its load of gravel into the storage compartment, and then proceed to obtain another load of gravel or perform some other revenue-producing service while the spreader is in operation. The compartment is so shaped that no substantial gravel-spillage problem is presented during operation of the gravel spreader.

The supply truck may discharge its load in one rapid operation at one place, so that there is no necessity to retain the usual crew members who manually control the continuous flow of gravel from a backing and driving truck to the prior-art driven spreader.

*The conveyor system*

The illustrative embodiment contemplates the flow of gravel from the storage compartment to the discharge zone in the front of the spreader. The means provided for depositing, at a uniform rate, a layer of gravel on the road being traversed comprises a pair of conveyors each of which includes a continuous belt 36A, 36B, respectively (Fig. 2). The upper runs of the belts travel forwardly and extend upwardly and forwardly to define the bottom of the storage compartment. It will be seen that the illustrative conveyor means shown comprises a pair of identical conveyors, one defining substantially the entire left half of the storage compartment bottom and the other defining substantially the entire right half. Since the conveyors are identical, the left-hand conveyor alone (including belt 36A) is described in detail, the suffixes "A" and "B" being employed to designate corresponding elements.

Belt 36A is driven by a front driving roller 37A (Fig. 1). Its upper run passes on top of and is supported by idler rollers 38A, 39A, 41A, 42A, 43A and 44A, these rollers being spaced apart, in the order named, from the front to the rear of the chassis frame. Its lower run pases under the aforementioned rollers but pases on top of and is supported by idler rollers 45A, 64A.

Figure 4:
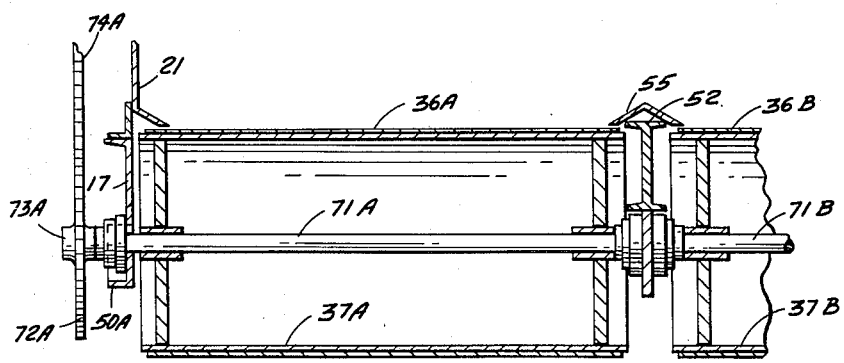
Figure 6:
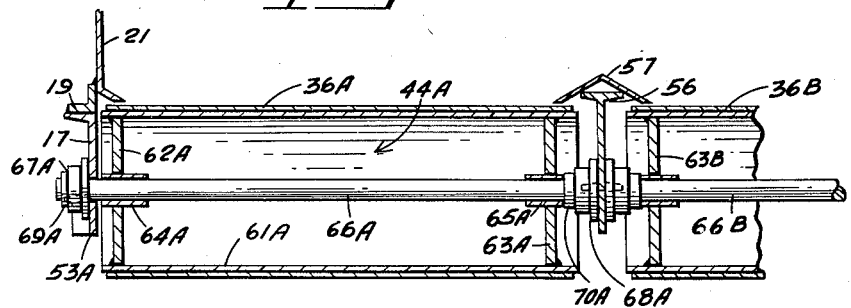
Figure 7:
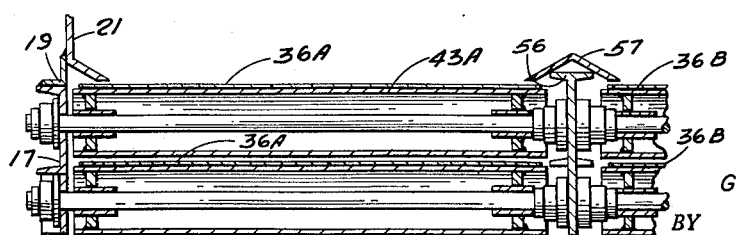

The constructions of the rollers 37A, 38A, 39A, 41A, 42A, 43A and 44A will be understood to be substantially the same, except for distinctions hereinafter pointed out. Those rollers (37A, 46A and 38A) in front of the steering column and main motive power drive are rotatably mounted between side frame member 17 (or depending extensions 50A, 51A thereof) and a central section 52 (Figs. 4 and 5). An inverted V-shaped metallic member 55 is secured to section 52 and overlies it, as well as the inner margins of belts 36A, 36B. Roller 37A and roller 46A are associated with and mounted on extensions 50, 51A respectively (Fig. 1). Those rollers behind the steering column, 39A, 41A, 42A, 43A, 44A are similarly mounted between the frame member 17 (or depending extensions thereof, 53A for roller 44A and 54A for roller 45A) and a central section 56 (Figs. 6 and 7). An inverted V-shaped metallic member 57, similar to member 52 is secured to member 56 and overlies it, as well as the inner margin of the belts. Sections 52 and 56 may be suitably supported in any conventional manner not necessary to be shown in detail herein.

It will be understood that rollers 38A, 39A, 41A, 42A and 43A may be exactly the same (Fig 1). Rollers 37A and 44A may be identical but roller 37A is preferably of a considerably larger diameter. Rollers 46A and 45A may be alike. Therefore only rollers 44A, 43A, 45A and 37A are chosen for purposes of specific detailed description, as representative of all.

The rear idler 44A (Fig. 6) comprises a heavy hollow metallic cylindrical body 61A, secured to circular end plates 62A, 63A, having hubs 64A, 65A keyed to a shaft 66A, rotatably journaled in bearings 67A and 68A fixed on extensions 53A and girder 56, respectively. Collars 69A and 70A are rigidly secured to shaft 66A, outside of bearing 67A and inside of bearing 68A, respectively, in order to hold the roller against axial displacement.

Rollers 43A and 45A (Fig. 7) are smaller in diameter than roller 44A but are similarly constructed, each being provided with a cylindrical body section, end plates, hubs keyed to a shaft, collars and bearings. Roller 45A is disposed below roller 43A so that the lower run of belt 36A passes between them.

The forward driving roller 37A (Fig. 4) has a body, end plates, hubs keyed to a shaft 71A, collars and bearings. Shaft 71A is extended beyond the outer collar and is keyed to hub 73A of a driving wheel or pulley 72A.

The lower run of the belt 36A passes between rollers 38A and 46A (Fig. 1). Roller 37A, being on the same shaft as pulley or sprocket 72A is driven thereby (Figs. 3 and 5). Pulley 72A is actuated by a continuous belt 74A, driven by a pulley 75A, the latter being secured to a shaft 76A and located on top of the upper left side of the body, slightly forwardly of the steering wheel.

The belt 36B is similarly provided with a set of ten rollers, corresponding with those just described, and a continuous driving belt and pulley 75B (Fig. 5).

The main belts 36A and 36B are so driven that their upper runs travel upwardly and toward the front of the gravel storage compartment. The lower margin of the rear body panel 23 is bent forwardly as indicated at 77 (Fig. 2), to a point approximately directly over shafts 66A, 66B, so that gravel discharge is prevented in this rear zone.

A discharge chute 80 (Fig. 1) is mounted in front of the spreader. It has an integral depending front wall, side walls and a curved rear wall, sloping downwardly, from a point adjacent belts 36A, 36B, and the periphery of rollers 37A, 37B, to a gravel discharge opening 81 near the roadway. Gravel is supplied to chute 80 by the belts and it falls downwardly and forwardly in the chute, finally being distributed on the roadway from opening 81. Opening 81 may be disposed as close to the roadway as is desired.

*The prime mover and transmission of power to the drive wheels and conveyor system*

A conventional internal combustion engine 82 and its associated accessories, radiator, flywheel and the like are mounted on support members 83 and 84 between front section 28 and a suitable cross-member (not shown), mounted between top side members 25 and 26. The main motor shaft 86 (Fig. 1) carries a gear 87 (Fig. 5), which drives gears 88 and 89, gear 89 serving as the main driving gear for the vehicular driving wheels and gear 88 functioning as the main driving gear for the conveyor system.

L-shaped right and left hand conveyor clutch levers 93, 94 (Figs. 2 and 5) are suitably mounted for limited rotation at a convenient location for the driver, to control the displacement of the tubular shifters 95, 96 respectively (Fig. 5), slidably mounted on rod 97, suitably mounted between vertical supports 98 and 99.

The shifters 95, 96 are respectively secured to links 100, 101, which in turn control the positioning of the driven clutch members of shafts 76A, 76B, respectively, such clutch members, which need not be shown in detail herein, being included in clutches indicated by the reference numerals 102, 103, respectively. The driving members of those clutches are driven by gear 88 and its shaft 104.

The conveyor driving shafts 76A, 76B are journaled in suitable bearings 105A, 106A and 105B, 106B on upstanding supports 107A, 98 and 107B, 99 respectively. These drive shafts carry pulleys 75A and 75B. The operation is such that when the handle of lever 94A is pushed forward, clutch shifter 96 and link 101 are displaced to the left, engaging clutch 103 so that sprocket or pulley 75B and the right hand shaft 76B are powered, whereby conveyor 36B is then driven. When the handle of the left-hand control lever 93 is pushed forward, shifter 95 and link 100 are displaced to the right, engaging clutch 102, so that pulley or sprocket 75A is powered to drive the left conveyor belt 36A.

This construction has the advantage that belts 36A and 36B are separately driven, so that, when both are in operation, gravel may be spread on a wide roadway. On the other hand, either the left or the right hand conveyor may be individually driven to distribute gravel on a narrow roadway. The latter operation is advantageous when public travel is maintained during the gravel-spreading project.

It will be understood that the speed of the conveyors increases directly as the speed of travel of the spreader as a whole, so that an increase in the area to be covered with gravel per unit of time is accompanied by an increase in the rate of flow of gravel to the chute 80. Suitable speed variation controls may be provided in the conveyor power driving system, if desired.

It will be understood that when the handles of control levers 94, 93 are retracted (turned clockwise and anti-clockwise, respectively) by the operator, the transfers of driving power to belts 36B, 36A, respectively, are interrupted.

Referring now to the transmission of vehicular-propelling power from the gear 89 (Fig. 5) to the wheels 13, 14, 15, 16, there is provided a clutch lever 110 (Fig. 3), adapted to be pushed forwardly (counterclockwise as seen from the left side), to move a linkage 111, 112 and engage a clutch 113 (Fig. 5), coupling the shaft 114 and driven members of the clutch to the driving members, rotationally synchronized with gear 89 and its shaft 115. Shaft 114 is enclosed in a protective tube 116. Secured to shaft 115 for rotation therewith is a gear 117, which powers other conventional gears in a differential gear housing 118, such as gear 127, to rotate shafts 119, 120. Those shafts are secured to and drive shafts 121, 122 through universal joints 123, 124. Shafts 121, 122 are rectangular in cross-section and slidably telescope within hollow shafts 125, 126, which drive sprocket wheels 128, 129 through universal joints 130, 131, respectively. These sprockets drive sprockets 132, 133 through chains 135, 136, respectively. The sprockets 132, 133 are secured to and drive wheels 14, 13 and 15, 16 in conventional manner.

It will be understood that any suitable conventional front-wheel drive may be employed in lieu of that herein specifically described. Also, any suitable conventional expedients may be used to transmit driving power from the prime mover to the conveyors.

*The steering system*

The steering wheel 79 (Fig. 3) is mounted in conventional fashion on a column 140 in front of the driver's seat 141. Secured to the steering wheel for rotation with it is a shaft 142, carrying the usual worm gear 143, which engages with a sector gear 144 to control the angular position of a link 145. This link in turn controls the displacement of a steering rod 146, secured to the drive-and-brake housing 147 of wheel 14 through a pin 148 (Fig. 1) in conventional manner. A radius rod assembly 149 is secured to housing 147 of wheel 14 and the corresponding housing of wheel 15 in order to assure turning of the wheels in unison, the proper camber and toe-in being obtained by any suitable conventional expedients (not shown). Any of the usual steering mechanisms may be employed and that herein shown is illustrative only.

Thus, it will be apparent from the drawings and the above description of discharge chute 80 that an operator can manipulate the steering wheel to rapidly shift the lateral position in which gravel is being deposited.

*The roller system*

Rollers 11 and 12 are identical (Figs. 1 and 2). Roller 12 is provided with a central shaft 150, one end of which is rotatably mounted in a suitable journal 151 secured to a multiple-leaf type spring 152, mounted on suitable shackles 153, 154, fixed to cross-members 31 and 32, these members being extended outwardly beyond the side section 17. The other end of the roller shaft 150 is mounted in a suitable journal 155, similarly fixed to a leaf-type spring 156, carried in shackles 157, 158 located beneath the center line of the storage compartment.

Roller 11 is mounted in the same manner as roller 12 and the details need not be repeated herein.

It will be seen that the rollers, being mounted under the main bulk of the stored gravel, are aided by the weight of the gravel in compacting the distributed gravel.

The features to which principal attention is directed are the gravel spreader self-propulsion, the forwardly traveling conveyors defining a substantial portion of the bottom of the storage compartment, the combination of front gravel distribution and rear pressure-compacting means, the disposition of the large storage compartment relative to the road rollers in such a way that the weight of the stored gravel effectively aids in the compacting function of the rollers, and all the features of novelty, singly and in combination, which achieve the objects set forth above and are covered by the appended claim.

While there has been described what is at present considered to be the preferred form of the present invention it will be obvious to those skilled in the art that various substitutions of equivalents and modifications may be made therein without departing from the invention as defined by the appended claim.

Having fully disclosed, described and illustrated my invention, I claim:

A self-propelled gravel spreading vehicle comprising a body formed with a compartment for receiving gravel to be spread, a chassis for supporting the body, a roller extending across the rear of the chassis for supporting the rear of said chassis, one front wheel at each side of the front of the chassis for supporting the front of the chassis and steering the vehicle, a steering wheel operatively connected with said front wheels, a discharge chute extending across the front of said vehicle and ahead of the wheels whereby an operator at the steering wheel can rapidly shift the lateral positions in which gravel is being deposited, said compartment including front and rear end walls and a pair of generally wedge-shaped trapezoidal sidewalls, generally level at the top and the bottom sloping upwardly from rear to front, and a conveyor sloping upwardly from rear to front and forming a bottom for said compartment, said compartment and conveyor extending rearwardly beyond said roller with the greater portion of its volume above said roller, whereby the gravel contained therein adds weight to the roller for applying maximum rolling pressure to the materials discharged from said chute as the vehicle moves forward, said conveyor discharging into said discharge chute, and means for driving said conveyor at the desired speed to control the rate of gravel discharge from said chute.

GEORGE J. OSTERFELD.

References Cited in the file of this patent

UNITED STATES PATENTS

| Number | Name | Date |
|---|---|---|
| 1,242,558 | Johnston | Oct. 9, 1917 |
| 1,454,575 | Boyd | May 8, 1923 |
| 1,581,784 | Butler | Apr. 20, 1926 |
| 1,702,525 | Smith | Feb. 19, 1929 |
| 1,764,019 | Hardenbergh | June 17, 1930 |
| 1,924,825 | Young | Aug. 29, 1933 |
| 1,993,656 | Gardiner | Mar. 5, 1935 |
| 2,078,863 | Lundbye | Apr. 27, 1937 |
| 2,109,020 | Abernathy | Feb. 22, 1938 |
| 2,195,221 | Millikin | Mar. 26, 1940 |
| 2,197,878 | Robinson | Apr. 23, 1940 |
| 2,201,534 | Hallenbeck | May 21, 1940 |
| 2,258,205 | Halvorson | Oct. 7, 1941 |
| 2,289,168 | Barber | July 7, 1942 |
| 2,589,256 | Horning | Mar. 18, 1952 |

FOREIGN PATENTS

| Number | Country | Date |
|---|---|---|
| 824,601 | France | Nov. 10, 1937 |